United States Patent [19]

Gardner et al.

[11] Patent Number: 5,008,026

[45] Date of Patent: Apr. 16, 1991

[54] WELL TREATMENT COMPOSITIONS AND METHOD

[75] Inventors: Tommy R. Gardner; Walter R. Dill; William G. F. Ford; Karen L. King, all of Duncan, Okla.

[73] Assignee: Halliburton Company, Duncan, Okla.

[21] Appl. No.: 464,277

[22] Filed: Jan. 12, 1990

Related U.S. Application Data

[63] Continuation-in-part of Ser. No. 303,873, Jan. 30, 1989, abandoned.

[51] Int. Cl.$^5$ ............................................. E21B 43/27
[52] U.S. Cl. .............................. 252/8.553; 252/8.552; 166/307
[58] Field of Search ............... 252/8.551, 8.553, 8.554, 252/8.552; 166/307

[56] References Cited

U.S. PATENT DOCUMENTS

| | | | |
|---|---|---|---|
| 3,794,523 | 2/1974 | Thompson. | |
| 3,819,520 | 6/1974 | Jones et al. | 252/8.553 |
| 3,970,148 | 7/1976 | Jones et al. | 166/307 |
| 4,101,425 | 7/1978 | Young et al. | 252/8.553 |
| 4,146,499 | 3/1979 | Rosano | 252/186 |
| 4,414,120 | 11/1983 | Malloy et al. | 252/8.554 |
| 4,536,301 | 8/1985 | Malloy et al. | 252/8.554 |
| 4,601,836 | 7/1986 | Jones | 252/8.553 |
| 4,738,789 | 4/1988 | Jones | 252/8.553 |
| 4,823,874 | 4/1989 | Ford | 166/279 |
| 4,882,075 | 11/1989 | Jones | 252/8.553 |
| 4,886,609 | 12/1989 | Walton | 252/8.552 |
| 4,919,827 | 4/1990 | Harms | 252/8.553 |

*Primary Examiner*—Robert L. Stoll
*Assistant Examiner*—Chhaya Sayala
*Attorney, Agent, or Firm*—Robert A. Kent; Thomas R. Weaver; Clifford C. Dougherty, III

[57] ABSTRACT

A concentrate which forms an acid and/or water external microemulsion when added to a treatment fluid. The concentrate comprises an alkyl alcohol having in the range of from 4 to 18 carbon atoms, an emulsifying agent, a mutual solvent selected from the group consisting of glycol ethers and alkyoxylates of glycol ethers, and a co-solvent selected from the group consisting of polyethylene glycol, primary alcohols and alkyoxylates of alkyl alcohols. Also disclosed are an acid and/or water external microemulsion well treatment composition and a method of treating a subterranean formation to increase the production of hydrocarbons therefrom.

34 Claims, No Drawings

WELL TREATMENT COMPOSITIONS AND METHOD

CROSS REFERENCE TO RELATED APPLICATION

The present application is a continuation-in-part of U.S. application Ser. No. 303,873 filed Jan. 30, 1989, now abandoned.

BACKGROUND OF THE INVENTION

1. Field of the Invention

The present invention relates to compositions and methods for treating oil and gas wells to stimulate the production of hydrocarbons therefrom.

2. Description of the Prior Art

The use of acids and other fluids to clean up and stimulate the production of hydrocarbons from subterranean formations penetrated by well bores is well known. The acids and other fluids typically function to improve the natural drainage pattern of the formations and/or to remove barriers within the formations which prevent easy passage of the reservoir fluids through the formations into the well bores.

In treatments commonly referred to as "acidizing", an aqueous acid solution is pumped into the formation to increase the size of existing pores and to etch new flow channels therein. In treatments known as "fracturing", a fluid is forced into the formation under a pressure and at a rate such that one or more fractures in the formation are produced. An acid solution can be introduced into the fractures to etch flow channels and enlarge existing pore spaces in the faces thereof, and fluids carrying sand, walnut hulls and/or other small particles can be introduced into the fractures to keep the fractures open.

Special chemicals are typically admixed with acidizing, fracturing and other treatment fluids to increase the effectiveness thereof. For example, various surface active agents and mutual solvents are often admixed with treatment fluids to enhance the wetting ability of the fluids, to lower the interfacial tension between the fluids and oil and/or to lower the surface tension of the fluids. The treatment fluids are often used in the form of emulsions or micellar solutions to impart properties to the fluids that they would not otherwise have. The type of special chemicals and treatment system employed for a particular application depends on well characteristics and conditions, economics and the result desired.

In many instances, the ability of a treatment fluid to penetrate into the formation is limited due to the naturally low permeability of the formation rock or due to formation damage resulting from fines migration and/or partial plugging with organic and inorganic substances such as paraffin and asphaltene, drilling mud and thick emulsion sludges formed of water from the treatment fluid and oil. In other instances, natural circumstances such as the existence of an undesirable water zone above or below the formation being treated prevents the use of a pressure sufficient to force the treatment fluid deep into the formation or to initiate a fracture Unfortunately, the special chemicals and treatment systems currently available do not always effectively overcome these problems.

By the present invention, improved well treatment compositions and a method of treating a subterranean formation with the same are provided. The inventive compositions and method are particularly effective for use in naturally tight or damaged formations and in applications where the amount of pressure normally required to force the treatment fluid deep into the formation or to initiate a fracture cannot be employed.

SUMMARY OF THE INVENTION

In one aspect, the present invention provides a concentrate which forms an acid and/or water external microemulsion treatment composition when added to a treatment fluid. The concentrate comprises an alkyl alcohol having in the range of from 4 to 18 carbon atoms, an emulsifying agent, a mutual solvent selected from the group consisting of glycol ethers and alkyoxylates of glycol ethers, and a co-solvent selected from the group consisting of polyethylene glycol, primary alcohols and alkyoxylates of alkyl alcohols. The concentrate can be added to treatment fluids comprising straight acid, treatment fluids comprising aqueous acid solutions or treatment fluids comprising aqueous non-acid solutions.

In another aspect, the present invention provides an acid and/or water external microemulsion well treatment composition. The well treatment composition comprises a treatment fluid selected from the group consisting of acid, an aqueous acid solution and an aqueous non-acid solution, an alkyl alcohol microemulsified into the treatment fluid, an emulsifying agent, a mutual solvent selected from the group consisting of glycol ethers and alkyoxylates of glycol ethers, and a co-solvent selected from the group consisting of polyethylene glycol, primary alcohols and alkyoxylates of primary alcohols.

In yet another aspect, the present invention comprises a method of treating a subterranean formation to increase the production of hydrocarbons therefrom. The method comprises the step of contacting the formation with the water and/or acid external microemulsion well treatment composition of the present invention.

The interfacial tension of microemulsions is generally less than about 10 dyne/cm. for a 1.0 volume percent concentration. Due to this important property, acid and/or water external microemulsion well treatment compositions employing the concentrate of the present invention and the acid and/or water external microemulsion well treatment composition of the present invention do not separate into mutually insoluble phases and have the ability to penetrate into formations that have a naturally low permeability or are damaged by fines migration and/or deposits of organic and inorganic substances, drilling mud, emulsions and the like. The compositions readily displace oil and increase the relative permeability of the formation to aqueous fluids. The low interfacial tension of the compositions reduces the amount of pressure required to carry out the desired treatment.

It is, therefore, a principal object of the present invention to provide improved well treatment compositions and an improved method of treating subterranean formations.

Numerous other objects, features, and advantages of the present invention will be readily apparent to those skilled in the art upon a reading of the following disclosure including the examples provided therewith.

DESCRIPTION OF THE PREFERRED EMBODIMENTS

The present invention provides a concentrate which forms an acid and/or water external microemulsion well treatment composition when added to a treatment fluid, an acid and/or water external microemulsion well treatment composition and a method of treating a subterranean formation to increase the production of hydrocarbons therefrom. The inventive acid and/or water external microemulsion well treatment composition comprises the components of the inventive concentrate combined with a treatment fluid selected from the group consisting of acid, an aqueous acid solution and an aqueous non-acid solution The inventive method comprises the step of contacting the formation with the inventive acid and/or water external microemulsion well treatment composition.

The concentrate of the present invention comprises an alkyl alcohol having in the range of from 4 to 18 carbon atoms, an emulsifying agent, a mutual solvent selected from the group consisting of glycol ethers and alkyoxylates of glycol ethers, and a co-solvent selected from the group consisting of polyethylene glycol, primary alcohols and alkyoxylates of alkyl alcohols. In a preferred embodiment of the concentrate, the alkyl alcohol and emulsifying agent are microemulsified into the mutual solvent and co-solvent system. When added to straight acid or an aqueous solution, the concentrate forms an acid and/or water external microemulsion with the alkyl alcohol microemulsified into the acid and/or water phase.

Although the concentrate can be used with non-acid well treatment fluids such as non-acid hydraulic fracturing fluids, it is particularly suitable for addition to straight acid or aqueous acid well treatment fluids. Suitable acids include hydrochloric, acetic, citric, erythorbic, formic, hydrofluoric and mixtures thereof in concentrations ranging from 0.1 volume percent and up. Of course, the particular acid, aqueous acid or aqueous non-acid fluid employed varies depending on many factors including the end result desired. For example, as illustrated by Example VIII below, it has been found that certain well bore deposits are most effectively dissolved by a well treatment fluid comprising acetic acid and the inventive concentrate.

The alkyl alcohol preferably has in the range of from 4 to 10 carbon atoms. Examples of preferred alkyl alcohols include butanol, isobutanol, pentanol, isopentanol, hexanol, octanol and isooctanol. Most preferably, the alkyl alcohol has 8 carbon atoms. The alkyl alcohol functions to partition at the interface of immiscible fluids to provide approximately zero interfacial tension.

The alkyl alcohol is preferably present in the concentrate in an amount in the range of from less than 1% to about 50% by volume of the concentrate. More preferably, the alkyl alcohol is present in the concentrate in an amount in the range of from about 5% to about 25%, even more preferably from about 10% to about 18%, by volume of the concentrate. The amount of alkyl alcohol used depends on the conditions and characteristics of the well as well as the end result desired.

The emulsifying agent can be nonionic, cationic or anionic as long as a hydrophilic/lipophilic balance sufficient to obtain a stable micro dispersion of the alkyl alcohol into the acid and/or water phase is achieved. Examples of suitable emulsifying agents include ethoxylated alcohols, esters, alkyl sulfonates, alkyl phosphates, carboxylated-ethoxylated tallow amines, betaine compounds and mixtures thereof. Preferably, the emulsifying agent is selected from the group consisting of ethoxylated alcohols, ethoxylated nonylphenols, and betaine compounds. Most preferably, the emulsifying agent is an ethoxylated nonylphenol. A particularly suitable emulsifying agent comprises 70% by weight nonylphenol ethoxylated with approximately 20 moles of ethylene oxide, about 7% by weight ethylene glycol, about 5% by weight methanol and water.

The emulsifying agent is preferably present in the concentrate in an amount in the range of from less than 1% to about 50% by volume of the concentrate. More preferably, the emulsifying agent is present in the concentrate in an amount in the range of from about 1% to about 25%, even more preferably from about 10% to about 18%, by volume of the concentrate. The emulsifying agent functions to form and maintain a stable microemulsified dispersion of the alkyl alcohol in the acid and/or water phase. When added to the treatment fluid, the emulsifying agent is preferably dispersed in the acid and/or water phase with the alkyl alcohol.

The mutual solvent employed in the concentrate is preferably a glycol ether. Most preferably, the mutual solvent is ethylene glycol monobutyl ether (EGMBE). The co-solvent employed in the concentrate is preferably an alkyl alcohol selected from the group consisting of an alkyl alcohol having 6 carbon atoms and an alkyl alcohol having 7 carbon atoms, the alkyl alcohol being ethoxylated with 2 moles of ethylene oxide. Most preferably, the co-solvent is an alkyl alcohol having 7 carbon atoms and being ethoxylated with 2 moles of ethylene oxide. If desired, the mutual solvent and co-solvent can be a pre-formulated blend. A particularly suitable pre-formulated mutual solvent/co-solvent blend comprises about 50% by volume ethylene glycol monobutyl ether (EGMBE) as the mutual solvent and about 50% by volume of a mixture of alkyl alcohols having 6 to 7 carbon atoms and which are ethoxylated with 2 moles of ethylene oxide.

The function of the mutual solvent is to make otherwise insoluble chemicals soluble in the aqueous phase. The function of the co-solvent is to enhance the performance of the mutual solvent and to aid in the formation and maintenance of a stable microemulsified dispersion of the alkyl alcohol in the acid and/or water phase. The mixture of the mutual solvent and co-solvent interacts with the emulsifying agent or agents employed and effects the concentrations of alkyl alcohols that can be microemulsified.

The mutual solvent and co-solvent are each preferably present in the concentrate in an amount in the range of from less than 1% to about 50%, more preferably in the range of from about 20% to about 50%, by volume of the concentrate. Even more preferably, the mutual solvent and co-solvent are each present in the concentrate in an amount in the range of from about 32% to about 40% by volume of the concentrate. The mutual solvent and co-solvent combined are preferably present in the concentrate in an amount in the range of from less than 1% to about 90%, most preferably in the range of from about 64% to about 80%, by volume of the concentrate.

At the present time, the concentrate of the present invention most preferably comprises about 14.5% by volume 2-ethyl hexanol, about 14.5% by volume of the previously described preferred emulsifying agent and about 71% by volume of the decribed preferred mutual solvent. This embodiment of the concentrate is a clear liquid having a specific gravity of 0.93 at 60° F., a flash point of 122° F. and a pour point of less than −25° F.

The amount of the concentrate added to the acid, aqueous acid or aqueous non-acid well treatment fluid depends on the type of damage to the formation, if any, the degree of acid penetration desired, the volume of aqueous fluids present in the formation and many other factors commonly known to those skilled in the art. Generally, the well treatment fluid will contain in the range of from about 1% to about 10% by volume of the concentrate, more typically in the range of from about 1% to about 5% by volume of the concentrate. When the well treatment fluid is used to penetrate into a rock matrix, in the range of from about 1 to about 2 gallons of the concentrate are preferably used for every 1000 gallons of the treatment fluid. Generally, an interfacial tension of from about 2 to about 10 is achieved when the ratio of the concentrate to the treatment fluid is about 1:1000. If the well treatment composition is diluted with formation brine, however, the interfacial tension is increased thereby decreasing the penetration properties of the composition. In order to assure that the interfacial tension of the well treatment composition is maintained at a low level, the concentrate is most preferably employed in an amount of about 2 gallons for every 1000 gallons of the aqueous fluid.

If desired, the concentrate can be admixed with an aromatic solvent comprising at least one compound selected from the group consisting of benzene, toluene and xylene. The aromatic solvent is microemulsified into the acid and/or water phase with the alkyl alcohol and enhances the effectiveness of the same. Although the aromatic solvent can be admixed with the concentrate before the concentrate is added to the treatment fluid, it is preferably admixed with the treatment fluid before the concentrate is added thereto. When an aromatic solvent is employed, the ratio of the concentrate to the aromatic solvent is preferably in the range of from about 5:1 to about 6:1, most preferably about 5:1.

The acid and/or water external microemulsion well treatment composition of the present invention comprises the components of the concentrate of the present invention combined with a treatment fluid selected from the group consisting of straight acid, an aqueous acid solution and an aqueous nonacid solution. Preferably, the treatment fluid is either straight acid or an aqueous acid solution. Suitable acids include hydrochloric, acetic, citric, erythorbic, formic, hydrofluoric and mixtures thereof in concentrations ranging from 0.1 volume percent and up. Of course, if the treatment fluid is straight acid, the alkyl alcohol and aromatic solvent, if an aromatic solvent is employed, are microemulsified into the acid. If the treatment fluid is an aqueous acid or aqueous non-acid solution, the alkyl alcohol and aromatic solvent, if employed, are microemulsified in the water and acid or the water.

Preferably, the acid and/or water external microemulsion well treatment composition comprises in the range of from about 50% to about 99.9% by volume of the treatment fluid, in the range of from about 0.0145% to about 7.25% by volume of the alkyl alcohol, in the range of from about 0.0145% to about 7.25% by volume of the emulsifying agent, in the range of from about 0.0355% to about 17.75% by volume of the mutual solvent and in the range of from about 0.0355% to about 17.75% by volume of the co-solvent. When an aqueous acid solution is employed, the composition preferably comprises in the range of from about 90% to about 99.9% by volume of the aqueous acid solution, in the range of from about 0.0145% to about 1.45% by volume of the alkyl alcohol, in the range of from about 0.0145% to about 1.45% by volume of the emulsifying agent, in the range of from about 0.0355% to about 3.55% by volume of the mutual solvent and in the range of from about 0.0355% to about 3.55% by volume of the co-solvent. More preferably, when an aqueous acid solution is employed, the composition comprises in the range of from about 99.0% to about 99.9% by volume of the aqueous acid solution, in the range of from about 0.0145% to about 0.145% by volume of the alkyl alcohol, in the range of from about 0.0145% to about 0.145% by volume of the emulsifying agent, in the range of from about 0.0355% to about 0.355 by volume of the mutual solvent and in the range of from about 0.0355% to about 0.355 by volume of the co-solvent. When straight concentrated acid is employed, the volume of acid in the composition is preferably in the range of from about 90% to about 99.9%, most preferably in the range of from about 99.8% to about 99.9%.

Various additives such as emulsion preventers, anti-sludging additives and corrosion inhibitors can be effectively employed with both the concentrate and the well treatment composition of the present invention. The combination of the emulsifying agent, solvent and co-solvent employed in the inventive compositions prevents such additives from separating during treatment. For example, physical plating of non-soluble emulsion breakers on the formation rock surface is reduced allowing the emulsion breakers to be carried with the acid to the live acid or spent acid interface. Chemical absorption of cationic surface active agents contained in corrosion inhibitors on limestone is prevented. The solubility of non-soluble additives is increased by hydrotrope effects from the mutual solvent and emulsifier.

The method of the present invention comprises contacting the formation with the inventive acid and/or water external microemulsion well treatment composition. The composition is introduced into the formation by way of the well bore and preferably allowed to react with the formation and dissolvable materials therein until spent. The spent composition is preferably then recovered from the formation together with fines, residue and other material produced as a result of reaction of the composition therewith.

Thus, the well treatment compositions of the present invention greatly enhance the ability of acid and other well treatment fluids to penetrate into naturally tight or damaged formations. As microemulsions, the inventive compositions are stable dispersions of one liquid in another in the form of spherical droplets having diameters of less than about 0.14 microns. The micro size droplets allow light to pass through the emulsions causing them to appear transparent. The volume of hydrocarbons that can be incorporated into the inventive compositions is greater than the volume of hydrocarbons that can be incorporated into micellar solutions. Due to the fact that they achieve a low interfacial tension, the inventive compositions enhance the dissolution and disintegration of normally encountered oil field deposits such as scales and muds far more readily than well treatment fluids comprising ordinary surface active agents. The inventive compositions effectively dissolve organic and inorganic substances such as paraffin and/or asphaltene co-deposited with acid soluble mineral deposits including carbonate and iron containing scales, various resins, maltines, naphthenic acids and other high molecular weight ring type organic compounds. The compositions dissolve emulsions and both water and oil based drilling muds, and can be used to increase penetration into wells having low bottom hole temperatures and low gravity crude oil therein.

The low interfacial tension makes the inventive microemulsions thermodynamically stable up to about 225° F. As discussed above, additives such as emulsion preventers, anti-sludging additives and corrosion inhibitors can be effectively employed with the microemulsions. The surface tension of the microemulsions is relatively low. The microemulsions do not cause unacceptable corrosion or form water and oil emulsions under normal circumstances. Although the compositions water wet both sand and limestone, adverse oil wetting of the formation rock surface is prevented. The compositions are compatible with dilution water, fresh and standard brine.

Due to their low interfacial tension, the compositions of the present invention reduce the pressure required to pump the well treatment fluid into the desired portion of the producing interval. Fracturing treatments can be carried out even if an undesirable water zone exists above or below the producing zone.

The compositions of the present invention can be employed as break-down acids ahead of fracturing treatments. A reduction in break-down pressure is achieved by increased matrix penetration of the compositions allowing for transmission of energy from the well bore to the formation rock.

In order to illustrate a clear understanding of the compositions and method of the present invention, the following examples are given. Although the examples are presented to illustrate certain specific embodiments of the invention, they are not to be construed as to be restrictive of the scope and spirit thereof.

A series of tests were carried out to determine various properties of the concentrate of the present invention. First, the temperature stability (Example I) and surface tension (Example II) of the concentrate were determined. Next, tests to determine the interfacial tension between various solutions and oils when the concentrate is added to the solutions (Example III), emulsion tests (Example IV) and flow tests (Example V) were conducted. Finally, the effectiveness of various aqueous acid solutions employing the inventive concentrate in dissolving various organic and inorganic well bore deposits was determined (Examples VII and VIII). In some of the tests, the inventive concentrate was compared to one or more other microemulsion concentrates.

For each test, the concentrate of the present invention comprised 14.5% by volume 2-ethyl hexanol, 14.5% by volume of an emulsifying agent comprising about 71% by weight nonylphenol ethoxylated with approximately 20 moles of ethylene oxide, about 7% by weight ethylene glycol, about 5% by weight methanol and water and 71% of a solvent/co-solvent blend comprising about 50% by volume ethylene glycol monobutyl ether (EGMBE) and about 50% by volume of a mixture of alkyl alcohols having 6 to 7 carbon atoms and ethoxylated with 2 moles of ethylene oxide.

The other microemulsion concentrates tested were two microemulsion concentrates comprising isopropanol, polyethylene glycol, 2-ethyl hexanol and ethoxylated phenolic resin with the only difference between the two being the relative amounts of the components employed, hereinafter referred to as microemulsion concentrate A and microemulsion concentrate B, and a commercially available microemulsion concentrate sold by Petrolite Corporation under the trade name TRETOLITE AW-7. TRETOLITE AW-7 comprises isopropanol, an alkylate phosphate ester and 2-ethyl hexanol.

EXAMPLE I

The concentrate of the present invention was tested with microemulsion concentrate A and microemulsion concentrate B for temperature stability in various live and spent acids and in API Standard Brine. The stability of the various fluids at 72° F. and the temperature at which the fluids inverted from a transparent microemulsion to an opaque macroemulsion were determined. The acids used were an aqueous acid solution comprising 15% by volume hydrochloric acid, an aqueous acid solution comprising 15% by volume spent hydrochloric acid, an aqueous acid solution comprising 12% by volume hydrochloric acid and 3% by volume hydrofluoric acid, an aqueous solution comprising 12% by volume spent hydrochloric acid and 3% by volume spent hydrofluoric acid, an aqueous solution comprising 15% by volume hydrochloric acid and 10% by volume acetic acid and an aqueous solution comprising 15% by volume spent hydrochloric acid and 10% by volume spent acetic acid.

The tests were carried out by admixing 99 milliliters of the solution being tested with an amount of the microemulsion concentrate being tested sufficient to form a solution containing 1% by volume of the microemulsion concentrate, and heating the solutions to their boiling points. The stability of the solutions at 72° F. and the temperature at which the solutions inverted from a transparent microemulsion to an opaque macroemulsion were noted.

The results of the tests are shown in Table I below.

TABLE I

| Fluid | Temperature Stability 72° F. | Inversion Temperature (°F.) |
|---|---|---|
| The Inventive Concentrate | | |
| 15% HCl | Stable | Greater than 210 |
| Spent 15% HCl | Stable | 180 |
| 12% HCl/3% HF | Stable | Greater than 210 |
| Spent 12% HCl/3% HF | Stable | 125 |
| API Standard Brine | Stable | Greater than 200 |
| 15% HCl/10% Acetic | Stable | 200 |
| Spent 15% HCl/10% Acetic | Stable | Greater than 125 |
| Microemulsion A | | |
| 15% HCl | Stable | Greater than 218 |
| Spent 15% HCl | Stable | Greater than 212 |
| 12% HCl/3% HF | Stable | Greater than 200 |
| Spent 12% HCl/3% HF | Stable | 140 |
| API Standard Brine | Stable | Greater than 212 |
| 15% HCl/10% Acetic | Stable | Greater than 188 |
| Spent 15% HCl/10% Acetic | Stable | Greater than 200 |
| Microemulsion B | | |
| 15% HCl | Stable | Greater than 200 |
| Spent 15% HCl | Stable | Greater than 200 |
| 12% HCl/3% HF | Stable | Greater than 200 |
| Spent 12% HCl/3% HF | Stable | 142 |
| API Standard Brine | Stable | Greater than 200 |
| 15% HCl/10% Acetic | Stable | Greater than 200 |
| Spent 15% HCl/10% Acetic | Stable | Greater than 200 |

The results of the tests show that the concentrate of the present invention is stable to the boiling point in solutions comprising 15% by volume hydrochloric acid, in solutions comprising 12% by volume hydrochloric acid and 3% by volume hydrofluoric acid and in solutions comprising 15% by volume hydrochloric acid and 10% by volume acetic acid. In the spent acid solutions, the concentrate of the present invention appeared hazy at ambient temperature, but became clear at a temperature above 90° F. and remained clear until the inversion temperature of the composition was reached. In live acid, the concentrate of the present invention, microeumlsion concentrate A and microemulsion concentrate B all have approximately the same stability characteristics. The inversion temperature where a macroemulsion occurs is lower with the concentrate of the present invention than with microemulsion concentrate A and microemulsion concentrate B.

EXAMPLE II

The surface tensions of the concentrate of the present invention and microemulsion B in an aqueous solution comprising 15% by volume hydrochloric acid and in API Standard Brine at concentrations of 1.0 and 0.1 percent by volume in each solution were determined. The surface tension measurements were made with a Du Nouy tensionmeter. The results of the tests are shown in Table II below.

TABLE II

| | Surface Tension | | |
| | | Surface Tensions (Dyne/cm) | |
| Concentrate | Fluid | 0.1% Concentrate | 1.0% Concentrate |
|---|---|---|---|
| Microemulsion B | 15% HCl | 44.1 | 32.8 |
| Microemulsion B | API Standard Brine | 36.8 | 35.2 |
| The Inventive Concentrate | 15% HCl | 40.7 | 26.5 |
| The Inventive Concentrate | API Standard Brine | 33.5 | 31.3 |

The results of the tests show that the surface tension of the inventive concentrate ranges from 26.5 to 40.7 dyne/cm. The surface tension reduction properties of the inventive concentrate and Microemulsion B were approximately the same in API Standard Brine. Microemulsion concentrate B achieved lower surface tensions in live 15% hydrochloric acid.

EXAMPLE III

The interfacial tensions between various solutions and oil when the concentrate of the present invention and microemulsion B are employed in the solutions were determined. The interfacial tensions between an aqueous solution comprising 15% by volume hydrochloric acid and kerosene, between an aqueous solution comprising 15% by volume hydrochloric acid and xylene, and between API Standard Brine and kerosene were measured for each microemulsion concentrate at microemulsion concentrate concentrations ranging from 1.0 to 0.001 volume percent in the aqueous phase. The interfacial tension measurements were made with a Du Nouy tensionmeter.

The results of the tests are shown in Table IV below.

TABLE IV

| | Interfacial Tensions | |
| Concentration (Vol. %) | Kerosene (Dyne/cm.) | Xylene (Dyne/cm.) |
|---|---|---|
| Microemulsion Concentrate B in 15% HCl | | |
| 1.0 | 2.0 | 1.2 |
| 0.1 | 6.67 | 8.2 |
| 0.01 | 18.24 | 25.73 |
| 0.001 | 19.71 | 26.64 |
| Microemulsion Concentrate B in API Standard Brine | | |
| 1.0 | 1.20 | — |
| 0.1 | 6.20 | — |
| 0.01 | 21.66 | — |
| 0.001 | 27.57 | — |
| Inventive Concentrate in 15% HCl | | |
| 1.0 | 7.5 | 5.9 |
| 0.1 | 11.5 | 10.3 |
| 0.01 | 19.1 | 16.1 |
| 0.001 | 22.0 | 21.4 |
| Inventive Concentrate in API Standard Brine | | |
| 1.0 | <1.0 | — |
| 0.1 | 5.3 | — |
| 0.01 | 13.3 | — |
| 0.001 | 23.1 | — |

The results of the tests show that both the inventive microemulsion concentrate and microemulsion concentrate B achieved interfacial tensions of approximately zero in the API Standard Brine tested at a concentration of 1.0 volume percent. The actual interfacial tension achieved with 0.1 volume percent of the inventive microemulsion concentrate in 15% hydrochloric acid when measured with kerosene was 11.5 dyne/cm. The actual interfacial tension achieved with 0.1 volume percent of the inventive microemulsion concentrate in 15% hydrochloric acid when measured with xylene was 10.3 dyne/cm. The normal interfacial tensions between 15% hydrochloric acid and xylene and between 15% hydrochloric acid and kerosene are in the range of from about 18 to about 20 dyne/cm.

EXAMPLE IV

The microemulsion concentrate of the present invention was tested for its tendency to form emulsions with various crude oils when employed at concentrations ranging from 0.1 volume percent to 5.0 volume percent in aqueous solutions comprising 15% by volume live hydrochloric acid and in aqueous solutions comprising 15% by volume spent hydrochloric acid. In some of the tests of the concentrate in live and spent acid solutions at a concentration of 0.1 volume percent, 0.2 volume percent of an acetylenic alcohol-containing corrosion inhibitor sold by Halliburton Services of Duncan, Oklahoma under the trade name "HAI-65" was employed. In some of the tests of the inventive concentrate in spent acid solutions at concentrations ranging from 0.1 volume percent to 1.0 volume percent, 0.1 volume percent of an emulsion breaker comprising a nonionic surface active agent consisting of various propoxylated amyl phenolic resins and 0.3 volume percent of "HAI-65" were employed.

The tests were carried out by admixing the particular concentration of the inventive microemulsion concentrate with the particular crude oil for one minute at 10,000 rpm with an Eberbach stirrer, transferring the emulsified fluid to a 100 milliliter graduated cylinder and recording the rate of separation as a function of time.

The results of the tests of the inventive concentrate in live 15% hydrochloric acid are shown in Table V below. The results of the tests of the inventive concentrate in spent 15% hydrochloric acid are shown in Table VI below.

TABLE V

Emulsion Tests - Inventive Microemulsion Concentrate in 15% by Volume Live HCl

| Time (Min.) | Concentration of Concentrate (Vol. %) | Corrosion Inhibitor[1] (0.2 Vol. %) | Percent Break | | | | | |
|---|---|---|---|---|---|---|---|---|
| | | | Crude (A)[2] | Crude (B)[3] | Crude (C)[4] | Crude (D)[5] | Crude (E)[6] | Crude (F)[7] |
| 1 | 5.0 | — | N.D. | N.D. | N.D. | N.D. | N.D. | N.D. |
| 5 | 5.0 | — | 2 | N.D. | N.D. | N.D. | 4 | N.D. |
| 10 | 5.0 | — | 14 | 6 | 4 | 2 | 16 | N.D. |
| 10[8] | 5.0 | — | 46 | 20 | 20 | 10 | 70 | N.D. |
| 1 | 1.0 | — | N.D. | N.D. | N.D. | N.D. | N.D. | N.D. |
| 5 | 1.0 | — | 2 | N.D. | N.D. | 1 | N.D. | 2 |
| 10 | 1.0 | — | 10 | 2 | N.D. | 2 | N.D. | 4 |
| 10[8] | 1.0 | — | 30 | 5 | 4 | 14 | N.D. | 14 |
| 1 | 0.1 | — | 20 | 100 | 0 | Tr. | 10 | 25 |
| 5 | 0.1 | — | 90 | 100 | 60 | 60 | 10 | 64 |
| 10 | 0.1 | — | 100 | 100 | 80 | 60 | 10 | 84 |
| 10[8] | 0.1 | — | N.D. | 100 | 88 | 60 | 10 | 92 |
| 1 | 0.1 | 0.2 | 4 | Tr. | 0 | 0 | 0 | 0 |
| 5 | 0.1 | 0.2 | 20 | 60 | 5 | Tr. | 0 | 20 |
| 10 | 0.1 | 0.2 | 22 | 65 | 10 | 10 | 0 | 60 |
| 10[8] | 0.1 | 0.2 | 60 | 100 | 10 | 92 | 92 | 100 |

Tr.—Trace
N.D.—Not Determined
[1]Sold by Hallibarton Services under the trade name "HAI-65".
[2]Bradford Crude.
[3]Wolf Creek Crude.
[4]Deese Crude.
[5]Ft. Payne Crude.
[6]Knox Crude.
[7]Permean Crude.
[8]Heated to 140° F. and maintained at that temperature for 10 minutes before the results were recorded.

TABLE VI

Emulsion Tests - Inventive Microemulsion Concentrate in 15% Spent HCl

| Time (Min.) | Concentration of Concentrate (Vol. %) | Corrosion Inhibitor[1] (.02) (Vol. %) | Emulsion Breaker[2] (Vol. %) | Percent Break | | | | | |
|---|---|---|---|---|---|---|---|---|---|
| | | | | Crude (A)[3] | Crude (B)[4] | Crude (C)[5] | Crude (D)[6] | Crude (E)[7] | Crude (F)[8] |
| 1 | 5.0 | — | — | N.D. | 1 | N.D. | N.D. | N.D. | 1 |
| 5 | 5.0 | — | — | N.D. | 2 | 1 | 1 | 1 | 2 |
| 10 | 5.0 | — | — | N.D. | 8 | 3 | 1 | 2 | 4 |
| 10[9] | 5.0 | — | — | 10 | 30 | 20 | 26 | 24 | 44 |
| 1 | 1.0 | — | — | N.D. | 1 | 1 | 1 | 1 | 2 |
| 5 | 1.0 | — | — | N.D. | 8 | 2 | 3 | 2 | 3 |
| 10 | 1.0 | — | — | 2 | 10 | 3 | 8 | 8 | 8 |
| 10[9] | 1.0 | — | — | 2 | 16 | 16 | 8 | 12 | 28 |
| 1 | 0.5 | — | — | 3 | 20 | 2 | 1 | 1 | 1 |
| 5 | 0.5 | — | — | 4 | 80 | 4 | 3 | 12 | 3 |
| 10 | 0.5 | — | — | 10 | 98 | 12 | 13 | 34 | 10 |
| 10[9] | 0.5 | — | — | 56 | 98 | 28 | 44 | 90 | 44 |
| 1 | 0.1 | — | — | 10 | Tr. | Tr. | 5 | 5 | 15 |
| 5 | 0.1 | — | — | 48 | 80 | 24 | 5 | 10 | 40 |
| 10 | 0.1 | — | — | 80 | 100 | 70 | 80 | 30 | 60 |
| 10[9] | 0.1 | — | — | 94 | 100 | 90 | 96 | 96 | 97 |
| 1 | 0.1 | 0.2 | — | Tr. | Tr. | 0 | 0 | 0 | Tr. |
| 5 | 0.1 | 0.2 | — | 8 | 10 | 5 | 4 | 20 | 4 |
| 10 | 0.1 | 0.2 | — | 20 | 20 | 10 | 6 | 20 | 10 |
| 10[9] | 0.1 | 0.2 | — | 90 | 100 | 92 | 92 | 100 | 100 |
| 1 | 1.0 | 0.3 | 0.1 | Tr. | Tr. | 0 | 0 | 0 | 0 |
| 5 | 1.0 | 0.3 | 0.1 | 6 | 8 | 6 | 4 | 4 | 6 |
| 10 | 1.0 | 0.3 | 0.1 | 10 | 14 | 10 | 10 | 10 | 10 |
| 10[9] | 1.0 | 0.3 | 0.1 | 100 | 100 | 30 | 20 | 30 | 30 |
| 1 | 1.0 | 0.3 | 0.2 | Tr. | Tr. | 0 | Tr. | Tr. | Tr. |
| 5 | 1.0 | 0.3 | 0.2 | 8 | 10 | 6 | 4 | 2 | 6 |
| 10 | 1.0 | 0.3 | 0.2 | 12 | 12 | 12 | 10 | 8 | 10 |
| 10[9] | 1.0 | 0.3 | 0.2 | 100 | 100 | 76 | 40 | 24 | 70 |
| 1 | 0.5 | 0.3 | 0.1 | 0 | 10 | 0 | Tr. | 0 | 4 |
| 5 | 0.5 | 0.3 | 0.1 | 0 | 40 | 10 | 8 | 14 | 20 |
| 10 | 0.5 | 0.3 | 0.1 | 20 | 0 | 14 | 16 | 40 | 40 |
| 10[9] | 0.5 | 0.3 | 0.1 | 100 | 100 | 80 | 76 | 90 | 90 |

TABLE VI-continued

Emulsion Tests - Inventive Microemulsion Concentrate in 15% Spent HCl

| Time (Min.) | Concentration of Concentrate (Vol. %) | Corrosion Inhibitor[1] (.02) (Vol. %) | Emulsion Breaker[2] (Vol. %) | Percent Break | | | | | |
|---|---|---|---|---|---|---|---|---|---|
| | | | | Crude (A)[3] | Crude (B)[4] | Crude (C)[5] | Crude (D)[6] | Crude (E)[7] | Crude (F)[8] |
| 1    | 0.1 | 0.3 | 0.2 | 10  | 12  | Tr. | 0   | 0   | 0   |
| 5    | 0.1 | 0.3 | 0.2 | 100 | 100 | 8   | 8   | 6   | 10  |
| 10   | 0.1 | 0.3 | 0.2 | 100 | 100 | 20  | 14  | 10  | 20  |
| 10[9]| 0.1 | 0.3 | 0.2 | 100 | 100 | 82  | 60  | 80  | 80  |
| 1    | 0.1 | 0.3 | 0.1 | 20  | 30  | 35  | 10  | 5   | 8   |
| 5    | 0.1 | 0.3 | 0.1 | 50  | 55  | 60  | 40  | 42  | 45  |
| 10   | 0.1 | 0.3 | 0.1 | 100 | 90  | 88  | 80  | 88  | 82  |
| 10[9]| 0.1 | 0.3 | 0.1 | 100 | 100 | 100 | 100 | 100 | 100 |

Tr. — Trace
N.D. — Not Determined
[1]Sold by Halliburton Services of Duncan, Oklahoma under the trade name "HAI-65".
[2]A nonionic surface active agent consisting of various propoxylated amyl phenolic resins.
[3]Bradford Crude.
[4]Wolf Creek Crude.
[5]Deese Crude.
[6]Ft. Payne Crude.
[7]Knox Crude.
[8]Permean Crude.
[9]Heated to 140° F. and maintained at that temperature for 10 minutes before the results were recorded.

As shown by Table V, the inventive microemulsion concentrate tends to form a water external emulsion in live 15% hydrochloric acid at concentrations of 1.0 and 5.0 volume percent. At a concentration of 0.1 volume percent and with the addition of 0.2 volume percent of the corrosion inhibitor, the inventive concentrate achieved improved emulsion break characteristics with 4 of the 6 crude oils giving a 90% break after being heated for 10 minutes at 140° F.

As shown in Table VI, 1.0 volume percent of the inventive microemulsion concentrate with 0.1 volume percent or 0.2 volume percent of the emulsion breaker in spent 15% hydrochloric acid broke two out of the six crude oils after 10 minutes at 140° F. The addition of the emulsion breaker to spent 15% hydrochloric acid solutions containing 0.5 and 0.1 volume percent of the inventive concentrate improved the emulsion breaks. The solution containing 0.1 volume percent of the inventive concentrate, 0.3 volume percent corrosion inhibitor and 0.1 volume percent of the emulsion breaker led to a 100% break of all six of the crude oils after the emulsions were heated for 10 minutes at 140° F.

EXAMPLE V

A series of flow tests were conducted to determine if acid containing the inventive microemulsion concentrate is effective in regaining brine permeability of a formation after the formation is saturated with oil. Tests were conducted with acid containing no additives, acid containing "TRI-S ®", an alkyl aryl sulfonate surface active agent sold by Halliburton Services of Duncan, Oklahoma, acid containing TRETOLITE AW-7, acid containing microemulsion concentrate A, acid containing microemulsion concentrate B and acid containing the microemulsion concentrate of the present invention.

Each test was carried out in four stages. First, one liter of brine was pumped into a 6 inch by 1½ inch Berea Sandstone core in a Hassler sleeve and the permeability of t e core was determined. Next, one liter of kerosene was pumped into the core and the permeability of the core was determined. After the kerosene flow, one liter of the acid (either the acid with no additives or the acid with one of the additives) was pumped into the core and the permeability of the core was determined. Finally, a second liter of brine was pumped into the core, and the permeability of the core was determined. By comparing the permeability of the core after the initial brine stage to the permeability of the core after the final brine stage, the extent to which the brine permeability of the core was regained by flowing the core with the acid (either the acid with no additives or the acid with one of the additives) after the core was flowed with kerosene was determined. Throughout each test, the temperature in the core was maintained at 150° F. The core samples used in each test were all cut from the same block.

The results of the tests are shown in Tables VII-XII below.

TABLE VII

Flow Tests Using 15% HCl With No Additives

| Test No. | Fluid | Vol. (L) | Pumping Time (Min.) | Permeability* (md) |
|---|---|---|---|---|
| 1 | Brine    | 1 | 33 | 29.0 |
|   | Kerosene | 1 | 35 | 25.0 |
|   | 15% HCl  | 1 | 37 | 16.0 |
|   | Brine    | 1 | 34 | 19.0 |
| 2 | Brine    | 1 | 35 | 18.0 |
|   | Kerosene | 1 | 39 | 16.5 |
|   | 15% HCl  | 1 | 39 | 19.0 |
|   | Brine    | 1 | 35 | 21.0 |
| 3 | Brine    | 1 | 34 | 21.9 |
|   | Kerosene | 1 | 37 | 20.5 |
|   | 15% HCl  | 1 | 39 | 16.0 |
|   | Brine    | 1 | 35 | 18.8 |

*The permeability of the core at the end of each fluid stage.

TABLE VIII

Flow Tests Using 15% HCl and 0.5% TRI-S ®

| Fluid | Vol. (L) | Pumping Time (Min.) | Permeability* (md) |
|---|---|---|---|
| Brine | 1 | 35 | 13.4 |
| Kerosene | 1 | 25 | 16.0 |
| 15% HCl + 0.5% TRI-S ® | 1 | 49 | 5.5 |
| Brine | 1 | 118 | 1.5 |

*The permeability of the core at the end of each fluid stage.

TABLE IX

Flow Tests Using 15% HCl and 0.5% AW-7

| Fluid | Vol. (L) | Pumping Time (Min.) | Permeability* (md) |
|---|---|---|---|
| Brine | 1 | 34 | 19.0 |
| Kerosene | 1 | 43 | 17.0 |
| 15% HCl + 0.5% AW-7 | 1 | 48 | 10.8 |
| Brine | 1 | 39 | 11.2 |

*The permeability of the core at the end of each fluid stage.

TABLE X

Flow Tests Using 15% HCl and 0.5% Microemulsion Concentrate A

| Fluid | Vol. (L) | Pumping Time (Min.) | Permeability* (md) |
|---|---|---|---|
| Brine | 1 | 34 | 19.0 |
| Kerosene | 1 | 38 | 18.2 |
| 15% HCl + 0.5% EXXON PD 11849-96.6 | 1 | 46 | 6.0 |
| Brine | 1 | 75 | 2.5 |

*The permeability of the core at the end of each fluid stage.

TABLE XI

Flow Tests Using 15% HCl and 0.5% Microemulsion Concentrate B

| Fluid | Vol. (L) | Pumping Time (Min.) | Permeability* (md) |
|---|---|---|---|
| Brine | 1 | 34 | 16.8 |
| Kerosene | 1 | 43 | 10.5 |
| 15% HCl + 0.5% EXXON PD 11849-96.9 | 1 | 49 | 5.0 |
| Brine | 1 | 100 | 1.6 |

*The permeability of the core at the end of each fluid stage.

TABLE XII

Flow Tests Using 15% HCl and 0.5% of the Inventive Microemulsion Concentrate

| Test No. | Fluid | Vol. (L.) | Pumping Time (Min.) | Permeability* (md) |
|---|---|---|---|---|
| | Brine | 1 | 35 | 13.0 |
| | Kerosene | 1 | 38 | 14.0 |
| | 15% HCl + 0.5% Inventive Concentrate | 1 | 40 | 15.0 |
| | Brine | 1 | 34 | 16.5 |
| 2 | Brine | 1 | 37 | 7.0 |
| | Kerosene | 1 | 42 | 11.6 |
| | 15% HCl + 0.5% Inventive Concentrate | 1 | 41 | 10.0 |
| | Brine | 1 | 36 | 11.5 |

*The permeability of the core at the end of each fluid stage.

As shown by Table VII, two of the tests using acid with no additives showed a permeability loss ranging from 3.1 md to 10 md. Although the other test of the acid with no additives show a permeability increase of 3 md, it is believed that the core employed in this test was contaminated.

Surprisingly, the addition of 0.5% by volume of TRI-S ® to the acid led to a drastic permeability loss. As shown by Table VIII, the initial brine flow showed a permeability of 13.4 md while the final brine flow showed a permeability of 1.5 md. The exact cause of the permeability loss was not determined. As shown by Table IX, the addition of TRETOLITE AW-7 to the acid used in the acid stage did not cause a significant amount of kerosene to be removed from the core. The initial brine flow permeability was 19.0 md while the final brine flow permeability was 11.2 md.

As shown by Tables X and XI, acid containing microemulsion concentrate A and acid containing microemulsion concentrate B showed a reduction in permeability in the acid stages. The final brine stages showed a further reduction in regained brine permeability. The acid solutions containing microemulsion concentrates A and B did not remove a significant amount of kerosene as the respective acid stages were being pumped. Very little kerosene was noted in the final brine flow.

Table XII shows the results of the flow tests with the inventive microemulsion concentrate added to the acid. Acid containing the inventive microemulsion concentrate showed a rapid regain of permeability in both the acid stages and the subsequent brine stages. Acid containing the inventive microemulsion concentrate showed an increase in final brine permeability, and thus a small amount of stimulation to the cores. Acid containing the inventive concentrate showed a faster regain of permeability in acid as compared to the tests using the acid with no additives in the acid stage. Acid containing the inventive concentrate appeared to remove more kerosene in fewer pore volumes, thus reducing the two phase flow faster. In view of the initial permeability of the cores, the reduction of two phase flow shows that the inventive microemulsion concentrate will lead to higher flow rates and will reduce injection pressures required.

EXAMPLE VI

Tests were conducted to determine the corrosion rates of aqueous solutions comprising 15% by volume hydrochloric acid and the microemulsion concentrate of the present invention. Tests were conducted with both 0.1% and 0.5% by volume of the concentrate. A different corrosion inhibitor was employed in each test.

The tests were carried out by placing coupons and 100 ml of acid containing the desired amount of corrosion inhibitors and additives in a bath of constant temperature for a specified period of time. Corrosion loss was determined by weight loss.

The results of the tests are shown in Table XIII below.

TABLE XIII

Corrosion Tests

| Concentration of Concentrate (Vol. %) | Corrosion Inhibitor | Concentration of Corrosion Inhibitor (Vol. %) | Corrosion Loss (lb./ft.$^2$) |
|---|---|---|---|
| 0.1 | HAI-60* | 0.3 | 0.003 |
| 0.1 | HAI-65* | 0.2 | 0.003 |
| 0.1 | HAI-85* | 0.2 | 0.003 |
| 0.5 | HAI-60* | 0.3 | 0.005 |
| 0.5 | HAI-65* | 0.2 | 0.003 |
| 0.5 | HAI-85* | 0.2 | 0.002 |

*An acetylenic alcohol-containing corrosion inhibitor sold by Halliburton Services of Duncan, Oklahoma.

The results of the tests show that the inventive microemulsion concentrate does not cause unacceptable corrosion when employed at concentrations of 0.1 and 0.5 volume percent.

EXAMPLE VII

The microemulsion concentrate of the present invention was tested for its ability to enhance the effectiveness of an acid solution in dissolving organic and inorganic well bore deposits.

First, a well bore deposit consisting of what appeared to be a mixture of drilling mud, scale and formation fines was analyzed in the laboratory. The results of an x-ray diffraction analysis and an elemental analysis by x-ray fluorescence of the deposit are shown in Tables XIV and XV below.

Next, ten gram samples of the deposit were placed in various acid mixtures at ambient temperature and left undisturbed for 8 hours. The acid mixtures were an aqueous solution comprising 9% by volume hydrochloric acid and 6% by volume hydrofluoric acid, an aqueous solution comprising 9% by volume hydrochloric acid, 6% by volume hydrofluoric acid and 1% by volume TRI-S®, an alkyl aryl sulfonate surface active agent sold by Halliburton Services of Duncan, Okla., and an aqueous solution comprising 9% by volume hydrochloric acid, 6% by volume hydrofluoric acid and 1% by volume of a nonionic ethoxylated straight chain alcohol surface active agent sold by Halliburton Services of Duncan, Okla. under the trade name "PEN-5". The mixtures of hydrochloric acid and hydrofluoric acid by themselves and with 1% by volume TRI-S® yielded very little disintegration. The mixture of hydrochloric acid, hydrofluoric acid and 1% by volume PEN-5 led to about 25% disintegration of the deposit.

Finally, a 10 gram sample of the deposit was placed in an aqueous solution comprising 9% by volume hydrochloric acid, 6% by volume hydrofluoric acid and 1% by volume of the inventive microemulsion concentrate.

The addition of 1% by volume of the inventive microemulsion concentrate caused the deposit to react instantly with the acid and completely disintegrate within 3 hours. This shows that the inventive microemulsion concentrate can greatly enhance the dissolution and disintegration of normally encountered oil field deposits far more readily than ordinary surface active agents.

TABLE XIV

| X-Ray Diffraction Analysis | |
|---|---|
| Crystal | Concentration |
| Quartz — $SiO_2$ | Small |
| Zincite — $ZnO$ | Very Small |
| Calcite — $CaCO_3$ | Very Small |
| Calcium Sulfite Hydrate — $CaSO_3 \cdot \frac{1}{2}H_2O$ | Very Small |
| Siderite — $FeCO_3$ | Small-Moderate |
| Barite — $BaSO_4$ | Large |
| Magnetite — $Fe_3O_4$ | Small-Moderate |

TABLE XV

| Elemental Analysis by X-Ray Fluorescence | |
|---|---|
| Element | Concentration |
| Al — Aluminum | Small |
| Ba — Barium | Large |
| Ca — Calcium | Small |
| Cl — Chlorine | Very Small |
| Cu — Copper | Very Small |
| Fe — Iron | Small-Moderate |
| Mg — Magnesium | Very Small |
| Pb — Lead | 1.5% |
| S — Sulfur | Moderate-Large |
| Si — Silicon | Small |
| Zn — Zinc | Very Small |

EXAMPLE VIII

Tests were carried out to determine the effectiveness of acetic acid and the inventive microemulsion concentrate in dissolving organic and inorganic well bore deposits.

A well bore deposit from the Kern River Field, Kern County, California was analyzed in the laboratory. The results of an x-ray diffraction analysis of the inorganic portion of the deposit are shown in Table XVI below.

First, the solubility of a one gram sample of the deposit in 100 milliliters of an aqueous solution comprising 3% by weight hydrofluoric acid and 9% by weight hydrochloric acid after one hour of contact at 150° F. was determined to be 13.7%. The solubility of the organic portion of a 10 gram sample of the deposit in 100 milliliters of chloroform after 16 hours of contact at 200° F. was determined to be 12.2%. The solubility of the organic portion of a 10 gram sample of the deposit in 100 milliliters of xylene after 16 hours of contact at 200° F. was determined to be 8%. A loss-on-ignition test indicated that the deposit contained 61.2% inorganic solids and 38.8% organic substances.

Next, the solubilities of the deposit in two acetic acid solutions containing the microemulsion concentrate of the present invention were determined. The concentrations of acetic acid and the inventive microemulsion concentrate were different in each solution. One or more anti-sludging agents and/or acid corrosion inhibitors were added to the acetic acid in each test. Each test was carried out by dissolving a ten gram sample of the well bore deposit in 100 milliliters of the particular solution. The solubility of the deposit in the solution was determined after 18 hours of contact at 180° F.

The results of these tests are shown in Table XVII below.

TABLE XVI

| X-Ray Diffraction Analysis | |
|---|---|
| Crystal | Concentration (%) |
| Quartz — $SiO_2$ | 15-20 |
| Feldspar (Na, K, Ca) $Al_2Si_2O_8$ | 30-40 |
| Illite | 2-5 |
| Smectite | 10-15 |
| Amorphous Compounds | Moderate |

TABLE XVII

| Solubility Tests Using Acetic Acid and the Inventive Microemulsion Concentrate | | |
|---|---|---|
| Test No. | Fluid | Percent Dissolved |
| 1 | 80% (100% acetic acid) 19% inventive microemulsion 1% dodecyl benzene sulfonic acid 1% MSA Inhibitor[1] | 52.8 |
| 2 | 90% (10% acetic acid) 10% inventive microemulsion 1% MSA Inhibitor[1] | 68.9 |

[1] A corrosion inhibitor comprising a proprietary blend of nitrogen and sulfur containing compounds sold by Halliburton Services of Duncan, Oklahoma.

The results of the tests show that well treatment fluids comprising acetic acid and the inventive microemulsion concentrate effectively dissolve organic and inorganic well bore deposits. The acetic acid dissolves inorganic mineral compounds and enhances the solubility of organic compounds such as resins, maltines, naphthenic acids and other high molecular weight ring type organic compounds. When added to acetic acid, the inventive microemulsion concentrate increases the rate of dissolution of both organic compounds and inorganic minerals.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the compositions and method recited herein may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. A concentrate which forms an acid and/or water external microemulsion treatment composition when added to a treatment fluid comprising:
   (a) an alkyl alcohol having in the range of from 4 to 18 carbon atoms;
   (b) an emulsifying agent present in an amount sufficient to form and maintain a stable microemulsified dispersion of said alkyl alcohol in said acid and/or water external phase of said microemulsion treatment composition;
   (c) a mutual solvent selected from the group consisting of glycol ethers and alkyoxylates of glycol ethers; and
   (d) a co-solvent selected from the group consisting of polyethylene glycol, primary alcohol and alkyoxylates of alkyl alcohols, each of said components (a)-(d) being different compounds or different mixtures of compounds.

2. The concentrate of claim 1 wherein said alkyl alcohol has in the range of from 4 to 10 carbon atoms.

3. The concentrate of claim 1 wherein said alkyl alcohol has 8 carbon atoms.

4. The concentrate of claim 1 wherein said emulsifying agent is selected from the group consisting of ethoxylated alcohols, esters, alkyl sulfonates, alkyl phosphates, carboxylated-ethoxylated tallow amines, betaine compounds and mixtures thereof.

5. The concentrate of claim 1 wherein said emulsifying agent is an ethoxylated nonylphenol.

6. The concentrate of claim 1 wherein said mutual solvent is ethylene glycol monobutyl ether.

7. The concentrate of claim 1 wherein said co-solvent is an alkyl alcohol selected from the group consisting of an alkyl alcohol having 6 carbon atoms and an alkyl alcohol having 7 carbon atoms, said alkyl alcohol being ethoxylated with two moles of ethylene oxide.

8. The concentrate of claim 1 wherein said concentrate comprises in the range of from about 5% to about 25% by volume of said alkyl alcohol, in the range of from about 1% to about 25% by volume of said emulsifying agent, in the range of from about 20% to about 50% by volume of said mutual solvent and in the range of from about 20% to about 50% by volume of said co-solvent.

9. The concentrate of claim 1 wherein said concentrate comprises in the range of from about 10% to about 18% by volume of said alkyl alcohol, in the range of from about 10% to about 18% by volume of said emulsifying agent, and in the range of from about 64% to about 80% by volume of said mutual solvent and said co-solvent combined.

10. An acid and/or water external microemulsion well treatment composition comprising:
   (a) a treatment fluid selected from the group consisting of acid, an aqueous acid solution and an aqueous non-acid solution;
   (b) an alkyl alcohol having in the range of from 4 to 18 carbon atoms microemulsified into said treatment fluid;
   (c) an emulsifying agent present in an amount sufficient to form and maintain a stable microemulsified dispersion of said alkyl alcohol in said treatment fluid;
   (d) a mutual solvent selected from the group consisting of glycol ethers and alkyoxylates of glycol ethers; and
   (e) a co-solvent selected from the group consisting of polyethylene glycol, primary alcohols and alkyoxylates of alkyl alcohols, each of said components (a)-(e) being different compounds or different mixtures of compounds.

11. The well treatment composition of claim 10 wherein said treatment fluid is an aqueous acid solution comprising at least one acid selected from the group consisting of acetic acid, hydrochloric acid and hydrofluoric acid.

12. The well treatment composition of claim 10 further comprising an aromatic solvent microemulsified with said alkyl alcohol in said treatment fluid, said aromatic solvent being selected from the group consisting of benzene, xylene, toluene and mixtures thereof.

13. The well treatment composition of claim 10 wherein said alkyl alcohol has in the range of from 4 to 10 carbon atoms.

14. The well treatment composition of claim 10 wherein said emulsifying agent is selected from the group consisting of ethoxylated alcohols, esters, alkyl sulfonates, alkyl phosphates, carboxylated-ethoxylated tallow amines, betaine compounds and mixtures thereof.

15. The well treatment composition of claim 10 wherein said mutual solvent is ethylene glycol monobutyl ether, and said co-solvent is an alkyl alcohol selected from the group consisting of an alkyl alcohol having 6 carbon atoms and an alkyl alcohol having 7 carbon atoms, said alkyl alcohol being ethoxylated with 2 moles of ethylene oxide.

16. The well treatment composition of claim 10 wherein said composition comprises in the range of from about 0.0145% to about 7.25% by volume of said alkyl alcohol, in the range of from about 0.0145% to about 7.25% by volume of said emulsifying agent, in the range of from about 0.0355% to about 17.75% by volume of said mutual solvent, in the range of from about 0.0355% to about 17.75% by volume of said co-solvent and in the range of from about 50% to about 99.9% by volume of said treatment fluid.

17. The well treatment composition of claim 10 wherein said treatment fluid comprises an aqueous acid solution comprising in the range of from about 10% to about 100% by volume acetic acid and is present in said composition in an amount in the range of from about 50% to about 99.9% by volume of said composition.

18. A method of treating a subterranean formation to increase the production of hydrocarbons therefrom comprising contacting said formation with an acid and/or water external microemulsion well treatment composition comprising:
   (a) a treatment fluid selected from the group consisting of acid, an aqueous acid solution and an aqueous non-acid solution;

(b) an alkyl alcohol having in the range of from 4 to 18 carbon atoms microemulsified into said treatment fluid;

(c) an emulsifying agent present in an amount sufficient to form and maintain a stable microemulsified dispersion of said alkyl alcohol in said treatment fluid;

(d) a mutual solvent selected from the group consisting of glycol ethers and alkyoxylates of glycol ethers; and (e) a co-solvent selected from the group consisting of polyethylene glycol, primary alcohols and alkyoxylates of alkyl alcohols, each of said components (a)-(e) being different compounds or different mixtures of compounds.

19. The method of claim 18 wherein said alkyl alcohol of said well treatment composition has in the range of from 4 to 10 carbon atoms, said mutual solvent of said well treatment composition is ethylene glycol monobutyl ether, and said co-solvent of said well treatment composition is an alkyl alcohol selected from the group consisting of an alkyl alcohol having 6 carbon atoms and an alkyl alcohol having 7 carbon atoms, said alkyl alcohol being ethoxylated with 2 moles of ethylene oxide.

20. The method of claim 18 wherein said well treatment composition comprises in the range of from about 0.0145% to about 7.25% by volume of said alkyl alcohol, in the range of from about 0.0145% to about 7.25% by volume of said emulsifying agent, in the range of from about 0.0355% to about 17.75% by volume of said mutual solvent, in the range of from about 0.0355% to about 17.75% by volume of said cosolvent and in the range of from about 50% to about 99.9% by volume of said treatment fluid.

21. The method of claim 19 wherein said alkyl alcohol of said well treatment composition is selected from the group consisting of butanol, isobutanol, pentanol, isopentanol, hexanol, octanol and isooctanol.

22. The method of claim 19 wherein said alkyl alcohol of said well treatment composition has 8 carbon atoms.

23. The method of claim 19 wherein said alkyl alcohol of said well treatment composition is 2-ethyl hexanol.

24. The method of claim 19 wherein said emulsifying agent of said well treatment composition is selected from the group consisting of ethoxylated alcohols, esters, alkyl sulfonates, alkyl phosphates, carboxylated-ethoxylated tallow amines, betaine compounds and mixtures thereof.

25. The method of claim 19 wherein said emulsifying agent of said well treatment composition comprises an ethoxylated nonylphenol.

26. The method of claim 18 wherein said treatment fluid of said well treatment composition is an aqueous acid solution comprising at least one acid selected from the group consisting of acetic acid, hydrochloric acid and hydrofluoric acid.

27. The method of claim 18 wherein said well treatment composition further comprises an aromatic solvent microemulsified with said alkyl alcohol in said treatment fluid, said aromatic solvent being selected from the group consisting of benzene, xylene, toluene and mixtures thereof.

28. The method of claim 18 wherein said treatment fluid of said well treatment composition is an aqueous acid solution, and said well treatment composition comprises in the range of from about 0.0145% to about 1.45% by volume of said alkyl alcohol, in the range of from about 0.0145% to about 1.45% by volume of said emulsifying agent, in the range of from about 0.035% to about 3.55% by volume of said mutual solvent, in the range of from about 0.0355% to about 3.55% by volume of said co-solvent and in the range of from about 90% to about 99.9% by volume of said treatment fluid.

29. The well treatment composition of claim 10 wherein said alkyl alcohol is selected from the group consisting of butanol, isobutanol, pentanol, isopentanol, hexanol, octanol and isooctanol.

30. The well treatment composition of claim 10 wherein said alkyl alcohol has 8 carbon atoms.

31. The well treatment composition of claim 10 wherein said alkyl alcohol is 2-ethyl hexanol.

32. The well treatment composition of claim 10 wherein said emulsifying agent comprises an ethoxylated nonylphenol.

33. The well treatment composition of claim 10 wherein said treatment fluid is an aqueous acid solution, and said composition comprises in the range of from about 0.0145% to about 1.45% by volume of said alkyl alcohol, in the range of from about 0.0145% to about 1.45% by volume of said emulsifying agent, in the range of from about 0.0355% to about 3.55% by volume of said mutual solvent, in the range of from about 0.0355% to about 3.55% by volume of said co-solvent and in the range of from about 90% to about 99.9% by volume of said treatment fluid.

34. The concentrate of claim 1 wherein said alkyl alcohol is 2-ethyl hexanol.

* * * * *